United States Patent [19]
Peterson

[11] Patent Number: 6,048,907
[45] Date of Patent: Apr. 11, 2000

[54] APPARATUS AND METHOD FOR CONVERTING POLYETHYLENE TEREPHTHALATE INTO POLYESTER POLYOLS

[76] Inventor: Don Peterson, 2117 Opelousas, Houston, Tex. 77020

[21] Appl. No.: 09/379,271

[22] Filed: Aug. 23, 1999

Related U.S. Application Data

[63] Continuation-in-part of application No. 09/160,683, Sep. 25, 1998.

[51] Int. Cl.[7] ............................. C08J 11/04; C08G 85/00
[52] U.S. Cl. ............................. 521/48.5; 526/64; 526/65; 526/66; 526/71; 528/272; 525/437
[58] Field of Search .................................. 526/64, 65, 66, 526/71; 528/272; 525/437; 521/48.5

[56] References Cited

U.S. PATENT DOCUMENTS

| | | | |
|---|---|---|---|
| 3,652,466 | 3/1972 | Hittel et al. ............................. | 521/46 |
| 4,602,046 | 7/1986 | Buser et al. ............................. | 521/46 |
| 5,395,858 | 3/1995 | Schwartz, Jr. ............................. | 521/48 |
| 5,580,905 | 12/1996 | Schwartz, Jr. ............................. | 521/48 |

*Primary Examiner*—Samuel A. Acquah
*Attorney, Agent, or Firm*—Harrison & Egbert

[57] ABSTRACT

An apparatus for converting PET into polyester polyols including a reactor vessel having an interior volume, a stirring member rotatably mounted inside the reactor vessel and adapted to stir contents of the reactor vessel, a rotation device connected to the stirring member and adapted to rotate the stirring member in the reactor vessel, and a heater interactive with the interior of the reactor vessel so as to elevate the temperature of the interior volume of the reactor vessel to at least 175° C. The reactor vessel has an inner wall and an outer wall with a space therebetween. The heater passes a heated fluid into the space between the inner wall and the outer wall. The stirring member includes a tubular member extending through the interior volume of the reactor vessel and a plurality of stirring arms extending radially outwardly of the tubular member. The heater serves to pass heated fluid through the interior of the tubular member and into the interior passageway of the stirring arms.

24 Claims, 3 Drawing Sheets

APPARATUS AND METHOD FOR CONVERTING POLYETHYLENE TEREPHTHALATE INTO POLYESTER POLYOLS

RELATED APPLICATIONS

The present application is a continuation-in-part of U.S. application Ser. No. 09/160,683, filed on Sep. 25, 1998, and entitled "Apparatus and Method for Converting Polyethylene Terephthalate into Polyester Polyols", presently pending.

TECHNICAL FIELD

The present invention relates to processes for recycling polymeric material. More particularly, the present invention relates to apparatus and methods for the converting of polyethylene terephthalate plastics into polyester polyols. More particularly, the present invention relates to configurations of reactors for carrying out such a process.

BACKGROUND ART

Polyester is a polymeric material made from the esterification of polybasic organic acids with polyhydric alcohols. One exemplary polyester is manufactured by reacting dimethyl terephthalic acid with ethylene glycol so as to result in a compound chemically known as polyethylene terephthalate and commonly identified as PET. Polyesters are currently used as a base material in a wide variety of applications. For example, polyester is commonly used to make photographic films, x-ray films, bases for magnetic coating such as in recording tapes, beverage containers, surgical aids such as synthetic arteries, and as a fabric for making garments and other similar items. However, although polyester is very useful, the waste materials containing polyester are beginning to create a waste management and disposal problem.

Currently, those skilled in the art are seeking different methods for recovering and reusing polyester contained in waste PET plastic products. However, recovery of polyester from waste products has been difficult. In particular, many of the prior art processes are not capable of efficiently or economically recovering polyester due to non-PET contaminants and low densification.

Fundamentally, the process of converting polyethylene terephthalate to a polyester polyol involves the process for "cracking back". This "crack back" process is essentially one of heating the polyethylene terephthalate in the presence of excess amounts of glycols, alcohols, or other suitable polyols, such that a retrodegradation of the polymer molecule chain takes place. In the extreme case, monomer units of the acids and glycol can be produced. Lower molecular weight oligomers consisting of one to approximately twenty glycol and acid units depending on the desired properties of the end product is the goal of this conversion process.

This chemical process is generally referred to as transesterification whereby an excess of glycol is added and chemically attacks the ester bonds in the PET so as to break the existing ester bonds. Immediately thereafter, form new ester bonds form between the attacking glycols and the acid moieties which remain from cleaving the first ester bonds. The glycols of choice for such a process are diethylene glycol and propylene glycol. However, any glycol, alcohol or polyol with liquid temperatures less than the softening/melting temperature of the PET (approximately 175° to 250° C.) can be employed. The net result of this chemical reaction as the process proceeds is to change the ratio of reacted terephthalic acid to reacted glycol in the PET polymer from approximately 1.0 in the original starting material toward a theoretical limit of 0.5. In general, the final ratio will be in the range of 0.5 to 0.75.

This chemical process is shown chemically hereinbelow:

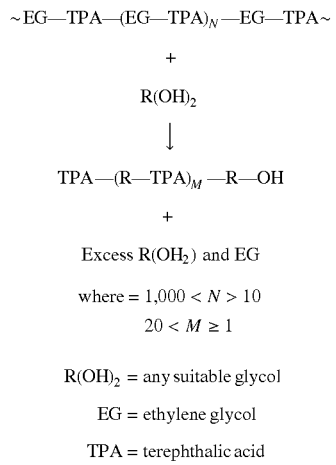

The rate of reaction is a function of the temperature, pressure and the degree to which the excess glycol and PET can be brought into intimate contact with one another. The process will proceed optimally at and beyond the temperature point where the PET has been converted to a melting stage in the presence of a suitable glycol raised to that same temperature. This is in the range of 175° to 250° C. Higher temperatures will increase the rate, but at a minimum, a melted state for the PET is needed in order to get commercially acceptable rates of reaction. For lower boiling glycols and alcohols, such as propylene glycol, the reaction vessel must be capable of maintaining pressure in order to permit heating these glycols to the minimum acceptable range of 230° to 250° C.

Given that acceptable temperatures and pressures can be achieved, the limiting parameter for the process becomes the degree to which intimate contact between the reactants can be maintained. For the PET crack back process, this is especially important. The free fall density of the PET raw material itself will generally be significantly less than that of the glycols used as the other reactant. The form of the PET can vary from very thin films and fiber types to granulated, flaked or pelletized types. The film and fiber types are the lowest density forms and the flaked, pelletized and granulated types are of the highest density forms. The use ratios between the PET and the glycols are typically in the range of about 60% to 150% by weight of glycol to the weight of the PET. In examples where the amount of glycol and PET by weight are equal, the volume occupied by the glycol may be from 20% to 60% of the volume of the PET depending on the free fall density of the PET which depends on its form. In examples of product where the amount of glycol needs to be less by weight than the weight of PET, the relative amount of volume occupied in a reaction vessel naturally becomes less.

In the prior art, so as to carry out such crack back processing, a vertical reactor has been employed with an agitator employing several sets of impeller blades so as to mix the ingredients and to keep the contents homogeneously dispersed. The typical vertical processing reactor has heat exchange from an outside source to the reactor contents by use of a hot oil or steam jacket mounted on the sidewalls and possibly the bottom cone of the reactor or by use of an internal coiled tube to convey the hot oil or steam mounted along the sidewalls of the reactor. In either case, the heat source for the reactor contents is mainly, if not exclusively, along the sidewalls of the reactor. Thus, the ability to provide good efficient heat transfer to the contents depends to a very significant degree on the agitator mixing and dispersing action such that materials heated at the sidewalls are continuously replaced by unheated materials away from the sidewall. This dispersing of the heat along with the contents is necessary so as to create the greatest efficiency in the heating process in addition to keeping the mixture homogeneous.

The major difficulty with crack back processing of PET by these conventional prior art vertical reactors is that the low density PET is both difficult to disperse by typical agitation and that the PET itself acts as a very poor conductor of heat. Thus, under typical conditions, when the necessary charges of PET and glycol are added together, the glycol portion occupies only a small portion of the space at the bottom of the reactor and the solid PET fills from the bottom of the reactor to the uppermost level. The glycol/PET lower occupied portion of the reactor, being a liquid with mixed solids, can be agitated provided that the lower impellers reach that lower level of the reactor. The "PET only" occupied portion of the reactor cannot be effectively agitated and, therefore, the heat produced from the sidewalls cannot be readily dispersed to those portions of the contents away from the sidewalls. Furthermore, the relatively low density PET material is a very poor conductor of heat. The net effect of these difficulties is that the PET contents in the upper areas of the reactor are very slow to heat and reach the melt point needed to make the process effective. The mixed glycol/PET contents in the lower part of the reactor can be effectively heated and possibly agitated. This becomes the only region of the reactor that is effectively participating in the chemical process of cracking back the PET. As this region completes the crack back process, and the excess glycol and now liquid cracked back polyol in that region forms, the PET from the upper regions of the reactor can become incorporated into this now-liquid region and can be cracked back as well. This becomes a very protracted process and is not very favorable to commercial conversions.

In the past, various patents have issued relating to the process for converting PET into polyesters. U.S. Pat. No. 4,602,046 discloses a method for the recovery of polyester from scrap material, such as photographic film, having a polyester base. The scrap material is cut or chopped into small individual pieces or flakes and treated in a caustic alkaline solution at a solids level of at least 25% by volume and under conditions of high shear.

U.S. Pat. No. 3,652,466 discloses another process of recovering the polyester from polyester films. The coated films are cut into small pieces and treated with a caustic aqueous alkali solution to form a slurry. The slurry is fed into a classification column in which the pieces move downward countercurrent to a moving column of aqueous liquid which separates the pieces from the coating material. The pieces are removed from the bottom of the column in suspension and can thereafter be used as a source of polyester material.

U.S. Pat. No. 5,395,858, issued on Mar. 7, 1995 to J. A. Schwartz, Jr. describes a process for recycling polyester contained in waste materials. The polyester is converted into ethylene glycol and terephthalic acid. The process includes first combining materials containing polyester with an alkaline solution so as to form a slurry. The slurry is heated so as to cause ethylene glycol to evaporate. The remaining product stream is then mixed with water and filtered to remove any undissolved impurities. The aqueous filtrate can be acidified causing terephthalic acid to precipitate. U.S. Pat. No. 5,580,905, issued to the same inventor, describes a similar process.

U.S. application Ser. No. 09/160,683, filed on Sep. 25, 1998, by the present inventor, is an apparatus for converting PET into polyester polyols, which includes a reactor vessel, a rotation means connected to the reactor vessel for rotating the reactor vessel, and a heating means interactive with the interior of the reactor vessel so as to elevate the temperature of the contents of the interior volume of the reactor vessel to at least 175° C. The reactor vessel extends in a generally horizontal orientation. A motor is connected to the reactor vessel so as to rotate the reactor vessel about its longitudinal axis. A plurality of heating pipes extends through the interior volume of the reactor vessel. The heating pipes each extend longitudinally through the reactor vessel adjacent to an inner wall of the reactor vessel.

Although this device by the present inventor is an effective mechanism for the conversion of PET into polyester polyols, it does have a relatively complex construction. In particular, the installation of the heating pipe array on the interior of the reactor vessel can be rather complicated and expensive. Furthermore, the rotation mechanism must be relatively large so as to assure the continual rotation of the reactor vessel. Since the entire reactor vessel is rotating, the actual loading and unloading of the interior volume of the reactor vessel becomes more difficult. As such, a similar approach to the conversion of PET into polyester polyols was envisioned by the present inventor.

It is an object of the present invention to provide an apparatus and method which effectively and efficiently converts waste PET materials into an polyester polyols.

It is another object of the present invention to provide an apparatus and method which facilitates the ability to intimately mix the glycol with the PET on the interior of the reactor vessel.

It is another object of the present invention to provide an apparatus and method which assures the optimum recovery of polyester polyols from a charge of PET and glycol.

It is still another object of the present invention to provide a method and apparatus which more effectively transmits heat thoroughly throughout the mixture of glycol and PET on the interior of the reactor vessel.

It is still another object of the present invention to provide a method and apparatus which is easy to use, easy to manufacture and relatively in expensive.

It is still a further object of the present invention to provide a method and apparatus which minimizes the energy requirements for the mixing of the contents of the reactor vessel.

It is another object of the present invention to provide a method and apparatus which assures more effective shredding of the PET material within the reactor vessel.

It is another object of the present invention to provide a method and apparatus which allows greater control of the heating of the interior of the reactor vessel.

These and other objects and advantages of the present invention will become apparent from a reading of the attached specification and pending claims.

SUMMARY OF THE INVENTION

The present invention is an apparatus for converting PET into polyester polyols. The apparatus of the present invention comprises a reactor vessel having an interior volume with an inlet and an outlet, a stirring member rotatably mounted in the reactor vessel and adapted to stir the contents of the reactor vessel, a rotation device connected the stirring member and adapted to rotate the stirring member in the reactor vessel, and a heater interactive with the interior of the reactor vessel. The heater is adapted to elevate the temperature of the interior volume of the reactor vessel to at least 175° C.

In the present invention the reactor vessel extends in a generally horizontal orientation. In other words, the reactor vessel, being of the cylindrical configuration has a longitudinal axis extending in a horizontal plane. The inlet is positioned at the top of the reactor vessel. The outlet is positioned adjacent to the bottom of the reactor vessel, either at the bottom of the reactor vessel or at an end of the reactor vessel. The reactor vessel has an inner wall and an outer wall. The inner wall and the outer wall define a space therebetween which is adapted to receive a heating fluid therein. This space is divided into a plurality of individual chambers each extending circumferentially around the reactor vessel. Each of the plurality of the individual chambers has a fluid inlet port and fluid outlet port.

In the present invention, the stirring member comprises a tubular member extending through the interior volume of the reactor vessel, and a plurality of stirring arms extending radially outwardly of the tubular member. Each of the plurality of stirring arms has an interior passageway communicating with an interior of the tubular member. The heater includes a heated fluid generator connected to the tubular member and adapted to pass heated fluid through the interior of the tubular member and into the interior passageway of the plurality of stirring arms. A paddle member is affixed to each of the ends of the plurality of stirring arms opposite the tubular member. This paddle member extends angularly outwardly from the stirring arm. The paddle member has an edge which is adjacent to an inner wall of the reactor vessel.

In the present invention, the rotation device comprises a motor having a shaft in geared connection with the stirring member. The motor rotates the stirring member around an axis in parallel relationship to the longitudinal axis of the reactor vessel. Also, in the present invention, the heater comprises a first heated fluid generator connected to the stirring member and adapted to pass a heated fluid into an interior of the stirring member. The heater also comprises a second heated fluid generator connected to the reactor vessel and adapted to pass a heated fluid into the space between the inner and outer walls of the reactor vessel.

The present invention is also a process for converting PET in polyester polyols comprising the steps of: (1) forming a reactor vessel having an interior volume and an inlet and an outlet; (2) loading a glycol into the interior volume; (3) loading PET into the interior volume; (4) heating the interior volume of the reactor vessel to a temperature of at least 175° C.; (5) rotating a stirring member within the reactor vessel so as to mix the glycol and the PET in the heated interior volume for a desired period of time; and (6) discharging the polyester polyols from the reactor vessel. The step of heating includes passing a heating fluid into the interior of the plurality of stirring arms. The step of rotating comprises rotating the stirring member around an axis parallel to the longitudinal axis of the reactor vessel. The step of heating further includes passing a heating fluid into the space between the inner and outer walls of the reactor vessel.

DETAILED DESCRIPTION OF THE INVENTION

Figure 1:
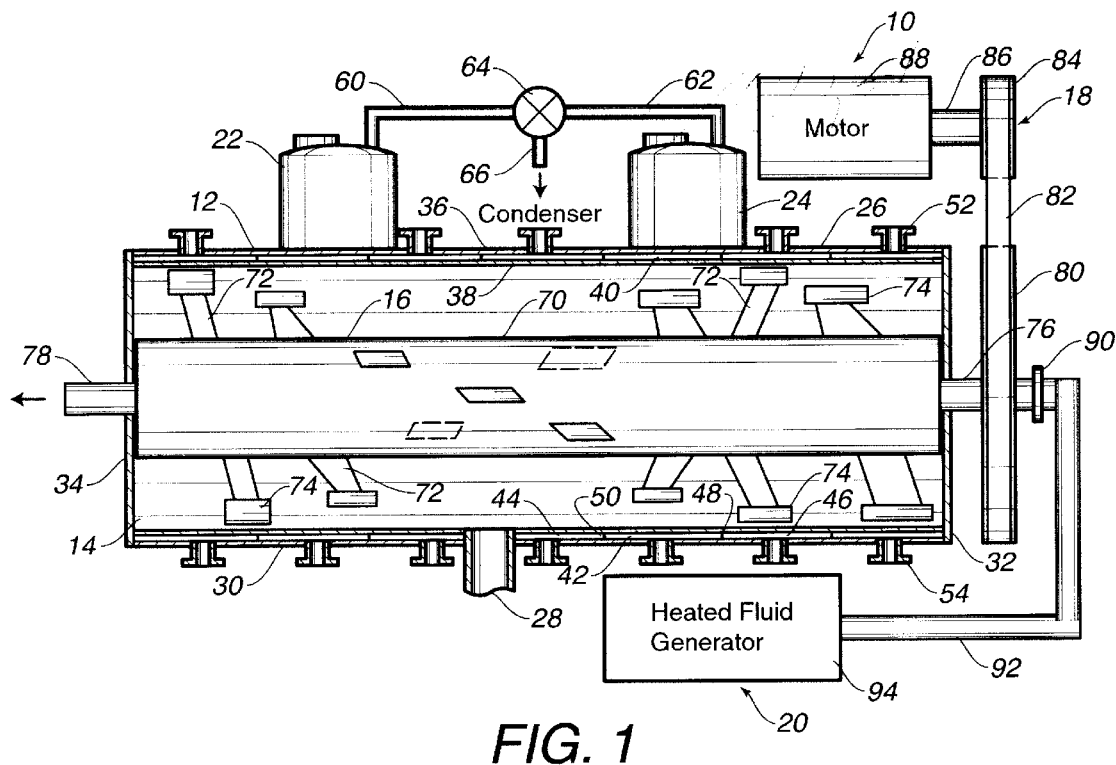
FIG. 1 is a partially cross-sectional side view and partially diagrammatic view of the apparatus of the present invention.

Referring to FIG. 1, there is shown the apparatus 10 for the converting of PET into polyester polyols. Apparatus 10 includes a reactor vessel 12 having an interior volume 14, a stirring member 16, rotatably mounted in the reactor vessel 12, a rotation device 18 connected to the stirring member 16 and adapted to rotate the stirring member 16 in the reactor vessel 12, and a heater 20 interactive with the interior of the reactor vessel 12 so as to elevate an interior of the reactor vessel 12 to a temperature of at least 175° C.

In the present invention, as shown in FIG. 1, the reactor vessel 12 has a generally cylindrical configuration. The longitudinal axis of the cylindrical vessel 12 extends in a horizontal plane. The reactor vessel 12 includes inlets 22 and 24 which are mounted on the top 26 of the reactor vessel 12. Each of the inlets 22 and 24 allows the PET material to be introduced into the interior volume 14 of the reactor vessel 12 and also allows the glycol to be introduced into the interior volume 14. The inlets 22 and 24 are actually hatches that are affixed to the top 26 of the reactor vessel 12. These inlets 22 and 24 can take on a wide variety of configurations. By placing the inlets 22 and 24 on the top 26 of reactor vessel 12, the PET material can be piled in each of the inlets 22 and 24 to a level above the top 26 of reactor vessel 12. As such, the inlets 22 and 24 can be suitably filled with the PET material such that the inlets 22 and 24 will continually release the PET material into the interior volume 14 as the PET material and glycol are converted into polyester polyols.

FIG. 1 shows an outlet 28 extending from the bottom 30 of the reactor vessel 12. The outlet 28 serves to pass the liquid polyester polyols outwardly of the interior volume 14 of the reactor vessel 12. The outlet 28 can be positioned on the bottom 30 or on either of the ends 32 or 34 of the reactor vessel 12. Within the concept of the present invention, the outlet 28 should be positioned adjacent to the bottom 30 so as to allow an easy flow of the liquid polyester polyols outwardly therefrom. Suitable valves can be connected to the outlet 28 so as to control the flow of the polyester polyols therefrom.

As shown in FIG. 1, the reactor vessel 12 has an outer wall 36 and an inner wall 38. The outer wall 36 and the inner wall 38 define a space 40 therebetween. This space 40 serves to receive a heating fluid therein for the purposes of elevating the temperature of the interior volume 14 of the reactor vessel 12. In particular, in the preferred embodiment of the present invention, the space 40 is divided into a plurality of individual chambers each extending circumferentially around the reactor vessel 12. As can be seen in FIG. 1, individual chamber 42 is separated from chambers 44 and 46 by walls 48 and 50. Also, each of the plurality of individual chambers, such as chamber 42, has a fluid inlet port 52 and a fluid outlet port 54.

As will be described herein after, a heated fluid generator can be connected to each of the fluid inlet ports 52 associated with the plurality of individual chambers, such as chamber 42, and also connected to the fluid outlet port 52. The heated fluid generator can be used so as to pass a heated oil into the space 40 between the outer wall 36 and the inner wall 38 of the reactor vessel 12. As an example, since chamber 42 is separated from chambers 44 and 46, the temperature in the zone of the interior volume 14 associated with chamber 42 can be adjusted to a different temperature than the zones associated with chambers 44 and 46. For example, hotter oil can be introduced into the fluid inlet port associated with chamber 42 than the oil introduced into chambers 44 and 46. As such, the configuration of the separate chambers between the inner wall 38 and the outer wall 36 allows the apparatus 10 of the present invention to more carefully and controllably apply temperature to the interior volume 14. Under certain circumstances, it may be desirable to have the temperatures at one end of the reactor vessel 12 higher than the temperatures at the opposite end of the reactor vessel 12. This is particularly the case where the outlet 28 is located at one of the ends 32 or 34 of the reactor vessel 12.

In FIG. 1, it is to be noted that the fluid inlet 22 has a conduit 60 extending outwardly therefrom. Similarly, the inlet 24 has a conduit 62 extending outwardly therefrom. Each of the conduits 60 and 62 are connected to valve 64. Valve 64 can be a check valve which is suitably adjusted so as to allow pressure buildups on the interior of the reactor vessel 12 to pass outwardly therefrom. As such, the use of valve 64 can effectively prevent an possible explosions from occurring. Still further, and alternatively, the valve 64 can be connected to a line 66 which delivers the gaseous byproducts through a condenser. Various other release valves can also be incorporated into the design of the reactor vessel 12 so as to assure the safe operation of the reactor vessel 12.

In FIG. 1, it can be seen that the stirring member 16 includes a tubular member 70 which extends through the interior volume 14 of the reactor vessel 12. A plurality of stirring arms 72 extend radially outwardly of the tubular member 70. Each of the stirring arms 72 has a paddle 74 affixed to an end thereof. Each of the paddles 74 has an outer edge which will pass in close proximity to the inner wall of the reactor vessel 12. The rotation of the tubular member 70 will cause each of the stirring arms 72, along with their associated paddles 74, to effectively stir the glycol/PET mixture in the interior volume 14. As the liquid polyester polyols begins to be formed, the paddles 74 will serve intimately lift and mix the polyester polyols with the glycol and PET material. The rotation of the stirring member 16 will create a "cascading" effect in the interior volume 14.

The stirring member 16 is bearingly and rotatably mounted into the ends 32 and 34 of the reactor vessel 12. A shaft 76 extends outwardly through the end 32 from the tubular member 70 associated with stirring member 16. Another shaft 78 will extend through the end 38. Shaft 76 is connected to a gear or sprocket 80. A chain or belt 82 will extend from a gear 84 attached to the shaft 86 of the motor 88. The motor 88, along with its shaft 86 and gear 84, form the rotation device 18 of the present invention. The belt 82 will serve to transfer the rotation of the gear 84 to the gear 80. As the motor 88 is activated, the rotation of the gear 84 will correspondingly rotate the gear 80 and the shaft 76. The rotation of shaft 76 will cause the tubular member 70, along with its stirring arms 72 and its paddles 74, to rotate within the interior volume 14 of reactor vessel 12.

In the present invention, the shaft 76 is a hollow shaft which communicates with the interior of the tubular member 70. A rotary union 90 serves to connect the shaft 76 with a conduit 92. Conduit 92 extends from steam generator 94.

The steam generator 94 can be suitably activated so as to pass steam through conduit 92, through the interior of shaft 76 and into the interior of the tubular member 70 of stirring member 16. Since the stirring arm 72 has interior passageways communicating with the interior of the tubular member 70, the steam from steam generator 74 will be delivered into the plurality of stirring arms. As such, steam from steam generator 94 will serve to elevate the temperature in the interior volume 14 of reactor vessel 12. The close and intimate contact between the stirring arms 72 and the outer surface of tubular member 70 with the material in the interior volume 14 will create a heat exchange effect so as to properly apply heat during the mixing of the PET material and glycol. Shaft 78, at the opposite end of the tubular member 70 from shaft 76 can serve as an outlet for the steam. Various other steam release mechanisms can also be incorporated so as to allow for the removal of built up steam from the interior volume 14 or from the interior of the tubular member 70.

In the present invention, as illustrated in FIG. 1, the mixing of the contents is accomplished by the rotation of the stirring member 16 by means of the motor 88 and the associated gearing mechanisms. As the stirring member 16 rotates, the materials within the interior volume 14 are mixed by being pushed toward the top 26 and then cascading toward the bottom 30 of the reactor vessel 12. Fresh material can be continuously resupplied to the interior volume 14 through the built up material in the inlets 22 and 24. This fresh material can then be brought into contact with the heated surfaces of the stirring member 16 so as to facilitate heat transfer to the contents of the reactor vessel 12. Most of the liquid glycol will remain in the lower portion of reactor vessel 12 and is heated by the walls of the reactor vessel 12. The heated glycol in the lower portion of the reactor vessel 12 is continuously brought into contact with the PET material through the tumbling action created by the stirring member 16. This greatly facilitates heat transfer to these contents. As an added benefit to both the heat transfer and to the chemical interactions, the glycol, after a short period of mixing, becomes distributed over all the PET surface area so as to insure intimate contact of the reactants. After suitable reaction intervals, samples of the product are taken and tested for specifications relating to viscosity and the completeness of the reaction. When the reaction is determined to be complete, the product is discharged to an intermediate storage tank where it is cooled before filtering and final storage or disposition. The reactor can then be reloaded with fresh contents. Also, the reactor vessel 12 can be maintained in its high temperature state to facilitate the heating of the next batch of materials.

For the processing of certain materials, the use of a condenser column may be desirable or required. The condenser column can be attached by way of a flexible hose, such as conduit 60 and 62, which can be attached to a hose coupling in the lids of inlets 22 and 24. This connection can also be used to introduce the glycol to the interior volume 14 at the loading stage of the process. The condenser can be brought into service by the use of valve 64 that can close off access to the conduits 60 and 62. The purpose of the condenser is to provide a means of pressure relief. Glycol vapors collect in the head space of the interior volume 14 of reactor vessel 12 as the glycols are heated up. Also, in the transesterification reaction proceeds, ethylene glycol from the PET is released as free glycol which can also contribute to the vapor pressure. In some product formulations, it is desirable to remove as much of the ethylene glycol as possible and to completely as possible replace the ethylene glycols with other glycols being added to the formulation. In another example of the use of the condenser column, it is desirable, in some cases, to use excess amounts of added glycol greater than what the final formulation would call for. The processing speed of the transesterification reaction can be significantly increased by the use of these large excesses of added glycol. However, this excess glycol needs later to be removed from the final product. This can be accomplished by allowing the glycol vapor to escape to the condenser where it can be collected, measured and saved for future use before the discharge of the final product with the desired ratios of PET and glycol.

Figure 2:
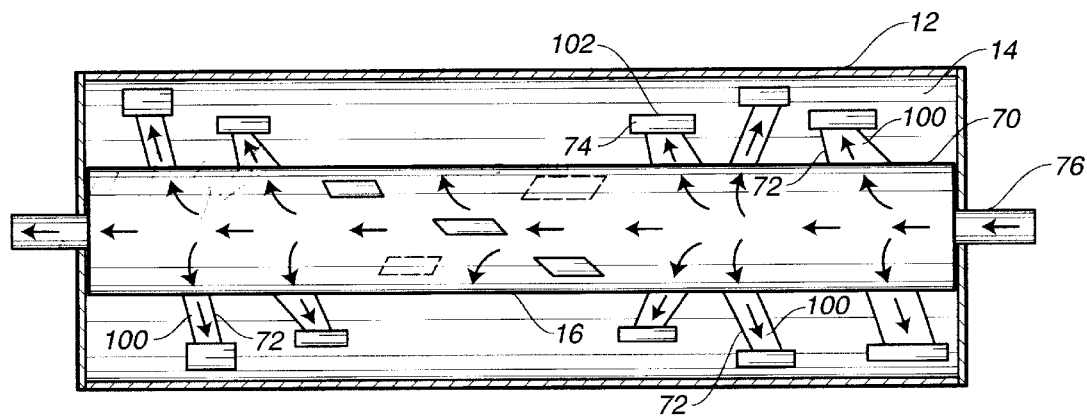
FIG. 2 is a cross-sectional top view of the apparatus of the present invention.

FIG. 2 shows the passing of steam from the steam generator 94 into the shaft 76 and into the interior of the tubular member 70 associated with the stirring member 16. As can be seen in FIG. 2, the arrows indicate the passing of the steam through the tubular interior of the tubular member 70 outwardly into the interior passageway 100 associated with each of the stirring arms 72. In this manner, the steam can serve to significantly elevate the temperature in the interior volume 14 of the reactor vessel 12. Ultimately, the temperature of the heated steam will have heat transfer effects by contact between the stirring arms 72 and the outer surface of the tubular member 70 with the material within the interior volume 14. The paddles 74 have an edge 102 which will move in close proximity to the inside surface of the wall of the reactor vessel 12. As such, these paddles 74 will serve to lift the material for distribution back onto the heated surfaces of the stirring member 16.

Figure 3:
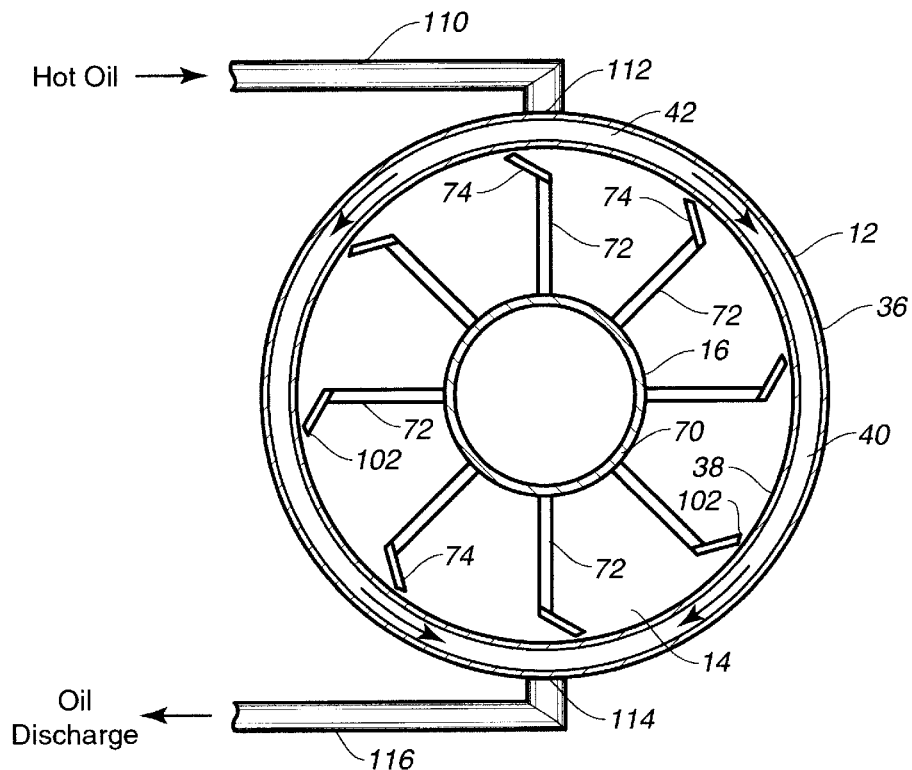
FIG. 3 is a cross-sectional end view of the apparatus of the present invention.

FIG. 3 shows how the chamber 42 is configured so as to receive heated oil therein. A heated fluid generator can be used so as to pass hot oil, at an elevated temperature, through pipe 110 into the inlet port 112 associated with chamber 42. This hot oil will flow downwardly through the chamber 42 in the space 40 between the outer wall 36 and the inner wall 38 of the reactor vessel 12. It can be seen that this chamber 40 extends circumferentially around the reactor vessel 12. As the heated oil flows downwardly from the inlet port 112 to the outlet port 114, it will have heat transfer effect onto the inner wall 38 of the reactor vessel 12. As such, the temperature of the interior volume 14 can be elevated. Any glycol contacting the inner wall 38 will elevate in temperature. The heated oil has been discharged through outlet port 114 and through pipe 116. Pipe 116 can be connected to a reservoir of oil or to the heated fluid generator so that the same oil can be reheated for redelivery through pipe 110 to inlet port 112.

In FIG. 3, the stirring member 16 is particularly illustrated. Each of the stirring arms 72 extends outwardly radially from the tubular member 70. Paddles 74 are connected to the ends of the arms 72 so as to reside in close proximity to the inner wall 38 of the reactor vessel 12. In particular, each of the paddles 74 extends angularly outwardly from the respective arms 72. An outer edge 102 of the paddle 74 will move in close proximity to the inner wall 38. The angled configuration of the paddle 74 with respect to the arms 72 creates a lifting and cascading effect of the material in the interior volume 14 of reactor vessel 12. This configuration urges the material in the interior volume 14 both toward and away from the inner wall 38 and also toward and away from the outer surface of the tubular member 70. As such, a true and complete intimate mixing of the glycol with the PET material can be assured.

Figure 4:
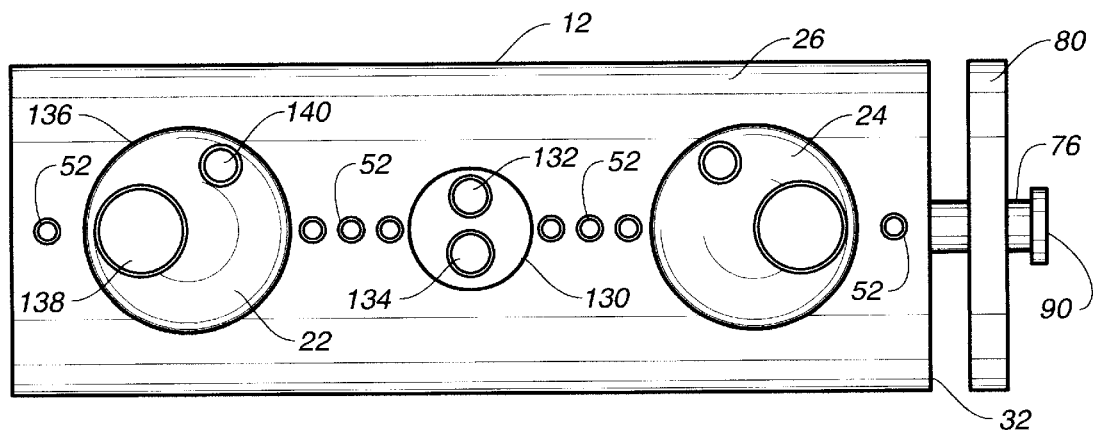
FIG. 4 is a plan view of the apparatus of the present invention.

FIG. 4 shows the top 26 of the reactor vessel 12. As can be seen in FIG. 4, gear 80 is connected to the shaft 76 so as to rotate the stirring member 16 on the interior of the reactor vessel 12. Rotary union 90 allows the shaft 76 to be connected to a source of heated fluid. The shaft 76 extends outwardly from the end 32 of the reactor vessel 12.

In FIG. 4, the condenser arrangement (shown in FIG. 1) has been removed for the purposes of clarity. Additionally, an access hatch 130 is shown on the top surface 26. Access hatch 130 can allow access to the interior of the reactor vessel 12. Alternatively, access hatch 130 can be used so as to introduce additional materials through orifices 132 and 134.

The first inlet 22 is in the form of hatch 136 of a generally circular configuration. Access opening 138 is formed on the top of the hatch 136 so as to allow for the introduction of materials or sampling from the interior volume of the reactor vessel 12. A vent 140 can be suitably connected to the conduit 60 for the delivery of vapors elsewhere or can simply be used as a relief vent for any gases on the interior volume 14 of the reactor vessel 12. Inlet 24 has an identical configuration as inlet 22. The arrangement of dual inlets 22 and 24 can allow for the introduction of material in one inlet while the other is full. It also allows for the double storage of PET material for delivery into the interior volume 14. FIG. 4 also shows how the various inlet ports 52 are arranged along the top surface 26 so as to allow access to the individual chambers formed between the inner wall 38 and the outer wall 36 of the reactor vessel 12.

Figure 5:
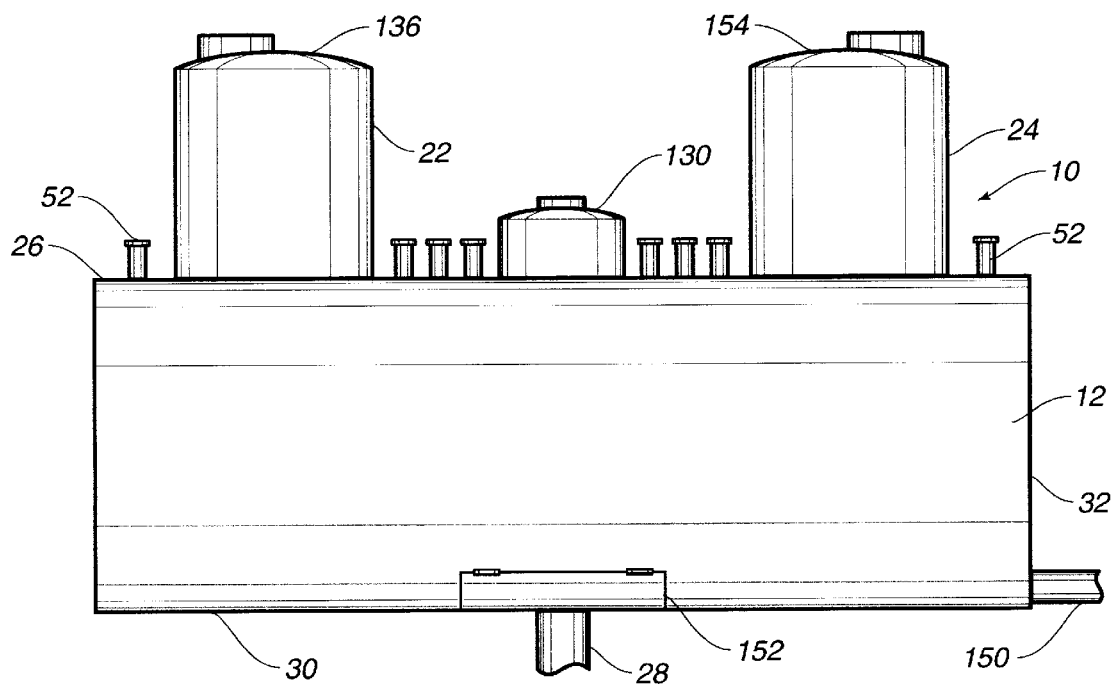
FIG. 5 is a side elevational view of the apparatus of the present invention.

FIG. 5 is a side view of the apparatus 10 of the present invention. FIG. 5 has the driving mechanism for the stirring member omitted for the purposes of illustration. In FIG. 5, it can be seen that the reactor vessel 12 has a generally cylindrical configuration. FIG. 5 shows that the outlet 28 can be affixed to the bottom 30 of the reactor vessel 12 or can extend, as outlet 150 from the end 32 of reactor vessel 12. A hatch 152 is formed adjacent to the bottom 30 of reactor vessel 12 so as to allow for access to materials on the interior of the reactor vessel 12. Hatch 152 can be suitably hinged so as to allow for relatively large opening and for easy access into the interior volume 14 of reactor vessel 12.

In FIG. 5, it can be seen that the inlet 22 includes its hatch 136 and that inlet 24 has a hatch 154 thereon. Access hatch 130 also shown as located between inlets 22 and 24. The various inlet ports 52 are arranged along the top surface 26 of the reactor vessel 12.

Figure 6:
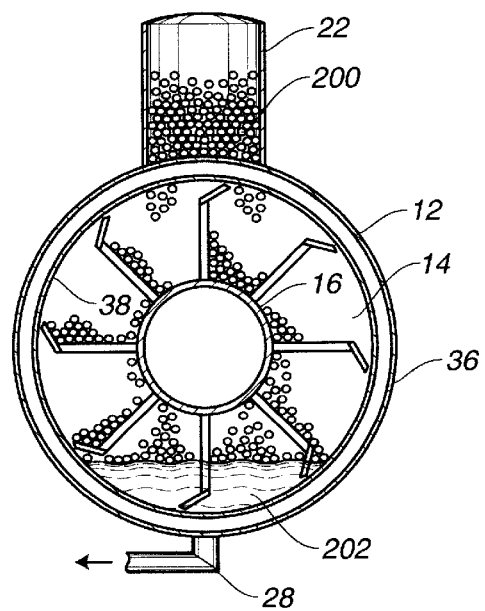
FIG. 6 is an illustration of the operation of the apparatus of the present invention.

FIG. 6 shows diagrammatically how the PET material 200 (shown in the form of pellets) is circulated throughout the interior volume 14 of the reactor vessel 12. As was stated previously, heated fluid will pass between the outer wall 36 and the inner wall 38 of the reactor vessel 12. Similarly, heated fluid will pass through the interior of the stirring member 16.

In FIG. 6, the inlet 22 is shown as being generally filled with the PET material 200. For the purposes of initial discussion, it is to be assumed that the PET material 200 also generally fills the interior volume 14 of the reactor vessel 12. The rotation of the stirring member 16 will cause the PET material 200 to circulate and mix with the glycol 202. Ultimately, the combination of heat with the glycol 202 and the PET material 200 will cause a conversion into polyester polyols. These polyester polyols can be removed from the interior volume 14 through outlet 28. The rotation of the stirring member 16, in the manner described herein previously, both serves to intimately mix the PET material 200 with the glycol 202, to deliver heat directly onto and throughout the PET material 200 and into the glycol 202, and also to further shred the PET material 200. The action of the stirring member 16 further assures that there are no residual clumps or pockets of unmixed PET residing in the interior volume 14. The present invention assures intimate mixing between the glycol and PET material.

In FIG. 6, as the polyester polyols are released through the outlet 28, additional PET material will enter the interior volume 14 form storage area associated with inlet 22. As such, the arrangement serves to enhance the capacity of the apparatus 10 of the present invention.

The foregoing disclosure and description of the invention is illustrative and explanatory thereof. Various changes in the details of the illustrated construction or in the steps of the described method can be made within the scope of the appended claims without departing from the true spirit of the invention. The present invention should only be limited by the following claims and their legal equivalents.

I claim:

1. An apparatus for converting PET into polyester polyols comprising:

a reactor vessel having an interior volume, said reactor vessel having an inlet and outlet, said reactor vessel extending in a generally horizontal orientation;

a stirring member rotatably mounted in said reactor vessel and adapted to stir contents of said reactor vessel;

a rotation device connected to said stirring member and adapted to rotate said stirring member within said reactor vessel;

and a heater interactive within interior of said reactor vessel, said heater adapted to elevate the temperature of said interior volume of said reactor vessel to at least 175° C.

2. The apparatus from claim 1, said reactor vessel comprising:

a cylindrical vessel having a longitudinal axis extending in a horizontal plane, said inlet positioned on a top of said cylindrical vessel, said outlet positioned adjacent a bottom of said cylindrical vessel.

3. The apparatus from claim 1, said cylindrical vessel having an inner wall and an outer wall, said inner wall and said outer wall defining a space therebetween adapted to receive a heating fluid therein.

4. The apparatus from claim 3, said space therebetween divided into a plurality of individual chambers each extending circumferentially around said cylindrical vessel.

5. The apparatus from claim 4, each of said plurality of individual chambers having a fluid inlet port and a fluid outlet port.

6. The apparatus from claim 1, said stirring member comprising:

a tubular member extending through said interior volume of said reactor vessel; and a plurality of stirring arms extending outwardly of said tubular member.

7. The apparatus from claim 6, each of said plurality of stirring arms having an interior passageway communicating with an interior of said tubular member, said heater comprising:

a heated fluid generator connected to said tubular member and adapted to pass heated fluid through said interior of said tubular member and into said interior passageway of said plurality of stirring arms.

8. The apparatus from claim 6, further comprising:

a plurality of paddle members respectively affixed to ends of said plurality of stirring arms opposite said tubular member.

9. The apparatus from claim 8, each of said plurality of paddle members extending angularly outwardly from a respective stirring arm of said plurality of stirring arms, each of said plurality of paddle members having an edge adjacent an inner wall of said reactor vessel.

10. The apparatus from claim 1, said rotation device comprising;

a motor having a shaft in geared connection with said stirring member, said motor rotating said stirring member around an axis in parallel relationship to a longitudinal axis of said reactor vessel.

11. The apparatus from claim 3, said heater comprising:

a first heated fluid generator connected to said stirring member and adapted to pass a heated fluid into an interior of said stirring member; and a second heated fluid generator connected to said cylindrical vessel and adapted to pass a heated fluid into said space between said inner wall and said outer wall.

12. An apparatus for converting PET into polyester polyols comprising:

a reactor vessel having an interior volume, said reactor vessel having an inlet and an outlet, said reactor vessel having an inner wall and an outer wall defining a space therebetween;

a stirrer rotatably mounted in said reactor vessel and adapted to rotate so as to stir contents of said reactor vessel; and a heated fluid generator connected to said reactor vessel and adapted to pass a heated fluid into said space so as to elevate a temperature of said interior volume of said reactor vessel to at least 175° C.

13. The apparatus of claim 12, said stirrer comprising:

a tubular member extending through said interior volume of said reactor vessel; and a plurality of stirring arms extending radially outwardly of said tubular member.

14. The apparatus of claim 13, each of said plurality of stirring arms having an interior passageway communicating with an interior of said tubular member, said heated fluid generator connected to said tubular member and adapted to pass another heated fluid through said interior of said tubular member and into said interior passageway of said plurality of stirring arms.

15. The apparatus of claim 12, said space therebetween being divided into a plurality of individual chambers each extending circumferentially around said reactor vessel, each of said plurality of individual chambers having a fluid inlet port and a fluid outlet port.

16. The apparatus of claim 12, further comprising:

a motor connected to said stirrer so as to rotate said stirrer around an axis parallel to the longitudinal axis of said reactor vessel, said longitudinal axis of said reactor vessel extending in a horizontal plane, said reactor vessel being stationary during a rotation of said stirrer.

17. An apparatus for converting PET into polyester polyols comprising:

a reactor vessel having an interior volume, having a longitudinal axis extending generally in a horizontal plane;

a stirrer rotatably mounted inside said reactor vessel and adapted to rotate around an axis parallel to said longitudinal axis of said reactor vessel and adapted to stir contents of said reactor vessel; and a heated fluid generator connected to said stirrer and adapted to pass heated fluid through an interior of said stirrer at an elevated temperature of said interior volume of said reactor vessel to at least 175° C.

18. The apparatus of claim 17, said stirrer comprising:

a tubular member extending through said interior volume of said reactor vessel; and a plurality of stirring arms extending radially outwardly of said tubular member, each of said plurality of stirring arms having an interior passageway communicating with an interior of said tubular member, said heated fluid generator connected to said tubular member and adapted to pass heated fluid through said interior of said tubular member and into said interior passageway of said plurality of stirring arms.

19. The apparatus of claim 17, said reactor vessel having an inner wall and an outer wall defining a space therebetween, said heated fluid generator adapted to pass another heated fluid into said space.

20. The apparatus of claim 19, said space therebetween divided into a plurality of individual chambers each extending circumferentially around said reactor vessel, each of said plurality of individual chambers having a fluid inlet port and a fluid outlet port.

21. A process for converting PET to polyester polyols comprising:

forming a reactor vessel having an inlet and outlet, said reactor vessel having an interior volume;

loading a glycol into said interior volume;

loading PET into said interior volume;

heating said interior volume of said reactor vessel to a temperature of at least 175° C.;

rotating a stirring member within said reactor vessel so as to mix said glycol and said PET in the heated interior volume for a desired period of time; and discharging the polyester polyols from said reactor vessel.

22. The process of claim 21, said step of forming comprising forming said reactor vessel of a cylindrical configuration having a longitudinal axis extending in a horizontal plane, said step of rotating comprising rotating said stirring member around an axis parallel to said longitudinal axis of said reactor vessel.

23. The process of claim 21, said stirring member being a tubular member having a plurality of stirring arms extending outwardly therefrom, each of said plurality of stirring arms having an interior passageway communicating with an interior of said tubular member, said step of heating comprising:

passing a heating fluid into said interior of said tubular member and into said interior passageway of each of said plurality of stirring arms.

24. The process of claim 21, said reactor vessel having an inner wall and an outer wall defining a space therebetween, said step of heating comprising:

passing a heating fluid into said space between said inner wall and said outer wall.

* * * * *